Le R. S. White,
Furniture Caster.
Nº 10,488.  Patented Jan. 31, 1854.
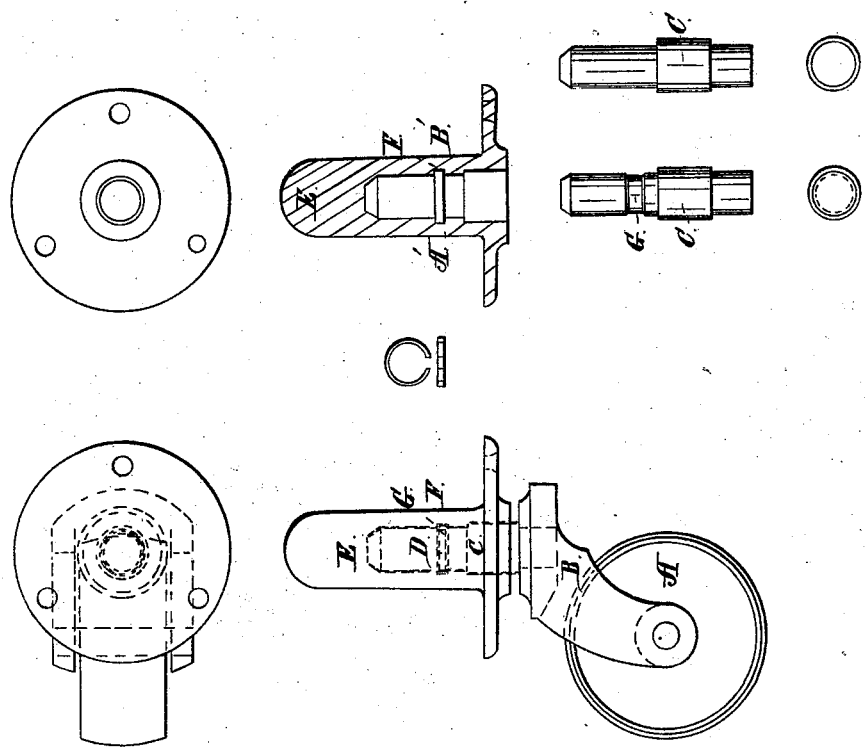
Witnesses:
H.C. Stevens,
Lyman White.
Inventor:
LeRoy S. White

UNITED STATES PATENT OFFICE.

LE ROY S. WHITE, OF CHICOPEE, MASSACHUSETTS.

IMPROVEMENT IN FURNITURE-CASTERS.

Specification forming part of Letters Patent No. 10,488, dated January 31, 1854.

*To all whom it may concern:*

Be it known that I, LE ROY S. WHITE, of Chicopee, in the county of Hampden and State of Massachusetts, have invented a new and Improved Method of Attaching and Detaching Shanks of Furniture-Casters to and from their sockets; and I do hereby declare that the following is a full and exact description thereof, reference being had to the accompanying drawings, and to the letters of reference marked thereon.

The nature of my invention consists in providing a spring or springs, D, in groove F of socket E, which will be expanded on forcing the conical end of the shank C into the socket E. When in place, the spring or springs D contract into groove G of shank C one-half the thickness of spring or springs D, thus producing the desired effect of attaching the shank C to the socket E. The groove G has beveled sides, and by pulling on fork B the spring or springs D expand and permit the shank C to be detached from the socket E, thus producing the desired effect of detaching the shank C from the socket E. In the case of the shank C without groove the spring D clasps the shank C with sufficient force to produce the desired effect of preventing the shank C from detaching itself by its own weight from the caster-socket E. The groove G, however, when made in the shank C is of great advantange, as it insures the shank from dropping out of the socket and relieves the spring from the continual tension to which it would be subjected were it made to bind in the shank. When the supporting-groove of the spring is made in the socket E instead of the shank C, the spring is retained in the socket when the shank is removed therefrom. By keeping it in the socket instead of in the shank it is not so liable to get lost or thrown out of place.

I do not claim the invention of making the shank of a caster detachable from its socket; nor do I claim the employment of a spring to hold the shank in the socket, nor the arrangement of said spring in a groove made in and around the shank, and the making the spring to bear against the internal surface of the socket made without a groove; but What I do claim as my improvement is—

The arrangement of the sustaining-groove F of the spring D in the socket E instead of in the shank C, so that when the shank C is being drawn out of the socket, or when it is within or out of the same, the spring will remain in the socket, and, in combination with the spring and groove made in the socket, making the groove G of the shank with its upper side flaring and the upper end of the shank beveling, as described, or, as represented in the drawing, the said flare of the side of the groove and the top rendering the shank capable of being detached from or attached to the socket.

LE ROY S. WHITE.

Witnesses:
LYMAN WHITE,
A. G. STEVENS.